United States Patent [19]
Russke

[11] Patent Number: 5,833,300
[45] Date of Patent: Nov. 10, 1998

[54] VEHICLE, PARTICULARLY WITH A FOLDING ROOF

[75] Inventor: Klaus Russke, Bissendorf, Germany

[73] Assignee: Wilhelm Karmann GmbH, Osnabrueck, Germany

[21] Appl. No.: 863,701

[22] Filed: May 27, 1997

[30] Foreign Application Priority Data

Jun. 8, 1996 [DE] Germany ............ 196 23 036.5

[51] Int. Cl.⁶ .................................................. B60J 7/12
[52] U.S. Cl. .................... 296/108; 49/249; 16/368
[58] Field of Search ........................ 296/108, 219, 296/220 (U.S. only), 220.01, 216.02, 216.03, 107.17; 49/246, 248, 249; 220/333; 16/366, 368–370

[56] References Cited

U.S. PATENT DOCUMENTS

| | | | |
|---|---|---|---|
| 1,280,357 | 10/1918 | Zuckerman | 16/369 |
| 2,845,299 | 7/1958 | Pickering | 49/249 |
| 4,510,714 | 4/1985 | Kasper et al. | 49/249 |
| 4,854,634 | 8/1989 | Shiraishi et al. | 296/108 |
| 5,080,428 | 1/1992 | Rouland | 296/219 X |
| 5,490,709 | 2/1996 | Rahn | 296/108 X |

FOREIGN PATENT DOCUMENTS

| | | | |
|---|---|---|---|
| 3635373 | 4/1988 | Germany | 296/108 |
| 2092661 | 8/1982 | United Kingdom | 16/370 |

*Primary Examiner*—Dennis H. Pedder
*Attorney, Agent, or Firm*—Jordan and Hamburg

[57] ABSTRACT

A vehicle with mutually moving parts, such as doors and hinged lids or hinged covers, particularly with a foldable roof, has at least one front roof part and one rear roof part. These roof parts are provided with at least one joint connection, which makes an open and a closed position possible, and is constructed as a hinged device, which can be actuated directly from a controllable driving device.

20 Claims, 12 Drawing Sheets

VEHICLE, PARTICULARLY WITH A FOLDING ROOF

The invention relates to a vehicle, particularly to a vehicle with a folding roof in the form of a two-part folding roof.

BACKGROUND OF THE INVENTION

In DE 34 16 286 A1, there is provided a folding roof with a roof construction defining at least one front roof part and one rear roof part. This roof construction has a hinged joint between the roof parts, which can be pivoted into an open and a closed position. In the region of the hinged joint, a transition piece and a flexible reinforcing strip are disposed as additional components between the roof parts, so that this roof-part connection is structurally expensive and the roof parts can be moved with complicated handling only in a pivoting angle of small range.

SUMMARY OF THE INVENTION

It is therefore an object of the invention to construct a vehicle, particularly a vehicle with a folding roof in such a manner, that the hinged joint of the roof, with little technical effort, makes possible a large pivoting angle in the region of the roof parts to form a space-saving packed position, and, without affecting the interior of the vehicle, facilitates the handling of the foldable roof during the opening and closing processes.

In the region of its two-part roof, the inventive vehicle has a hinged joint, the individual components of which are combined with a driving device, which can be controlled independently particularly of the driving mechanism for the roof in such a manner, that a directly driven hinged device is formed for moving the roof parts. This hinged device makes possible a pivoting movement of the roof parts over an angle of more than 180° in a very tight space and with components, which can be integrated largely into the vehicle roof, the control of the driving device of the apparatus being synchronized with a roof driving mechanism in the rear of the vehicle in such a manner that, in each phase of the motion in the swiveling points of the hinge parts and at the roof parts, an adjustment of the controlling torque and of the regulating speed, optimum with respect to load, is possible and, with that, a folding process, which is gentle for the material of hardtop roofs as well as for roofs with a regionally flexible roof skin, is attained.

In an appropriate embodiment, two hinged devices are provided, which are integrated into the edge of the roof parts and the driven pivoting elements of which make possible a stable support of the front roof part during the pivoting opening movement, as well as accurate guidance during the positioning into the closed position. In this closed position, the two roof parts, with their attitude stabilized, are brought with adequate certainty into the abutting position in the region of the hinged device, so that a sealing engagement is attained with adequate reliability in a front closing region towards the windshield frame as well as in a rear motion gap between the roof parts. By means of an appropriate arrangement of the pivoting axes of the apparatus, the latter can be adapted with little structural effort to different pivoting ranges of the roof parts and their common movement path can be traversed with accurate guidance even in the case of a simultaneous lifting and pivoting phase.

Reference is made to the following description and the drawings with respect to further significant advantages and details. An embodiment of the object of the invention is illustrated diagrammatically in the accompanying drawings.

DESCRIPTION OF THE PREFERRED EMBODIMENTS

Figure 1:
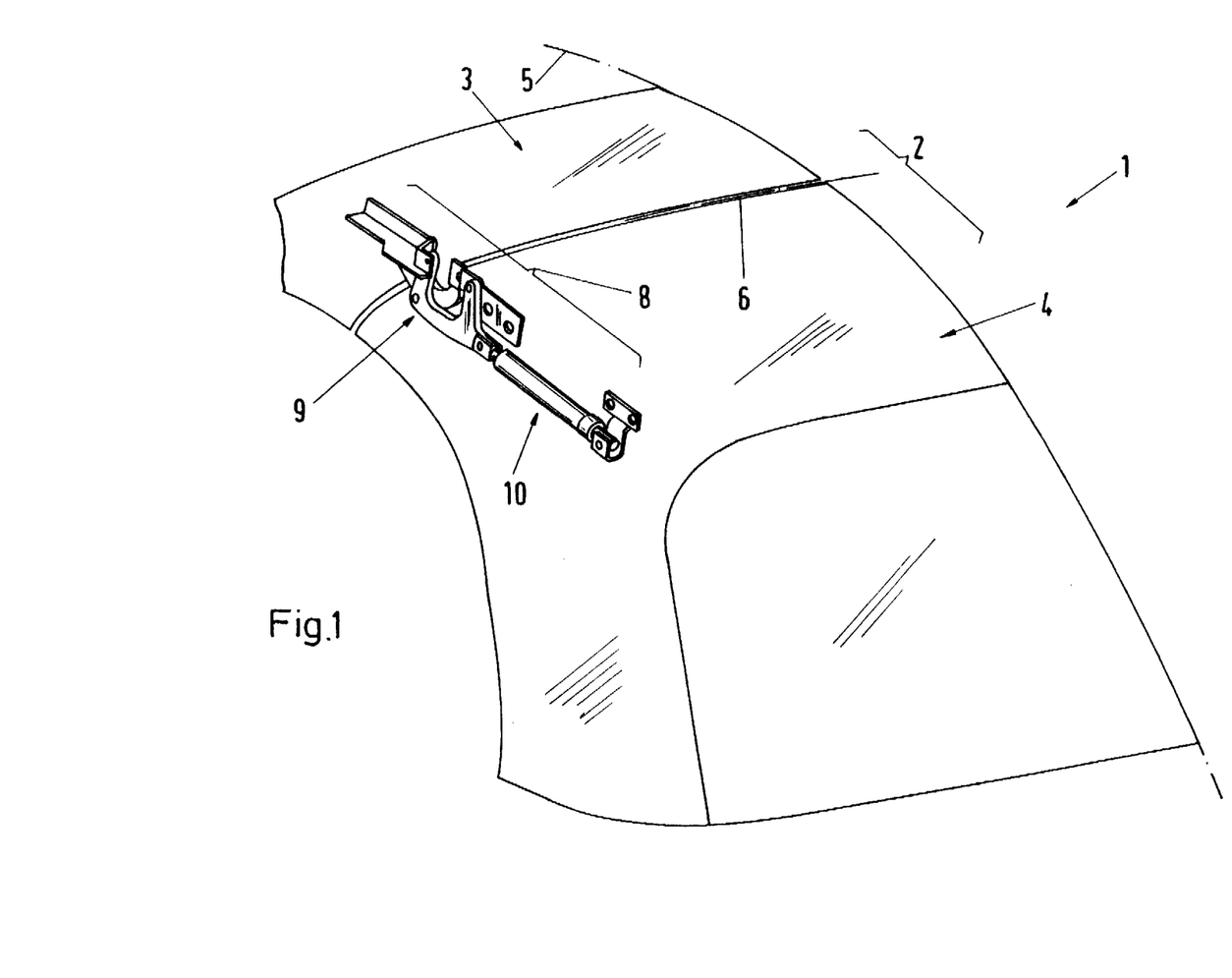
FIG. 1 shows a diagrammatic representation of a vehicle part in rear view with a hinged device between a front and a rear roof part.
Figure 2:
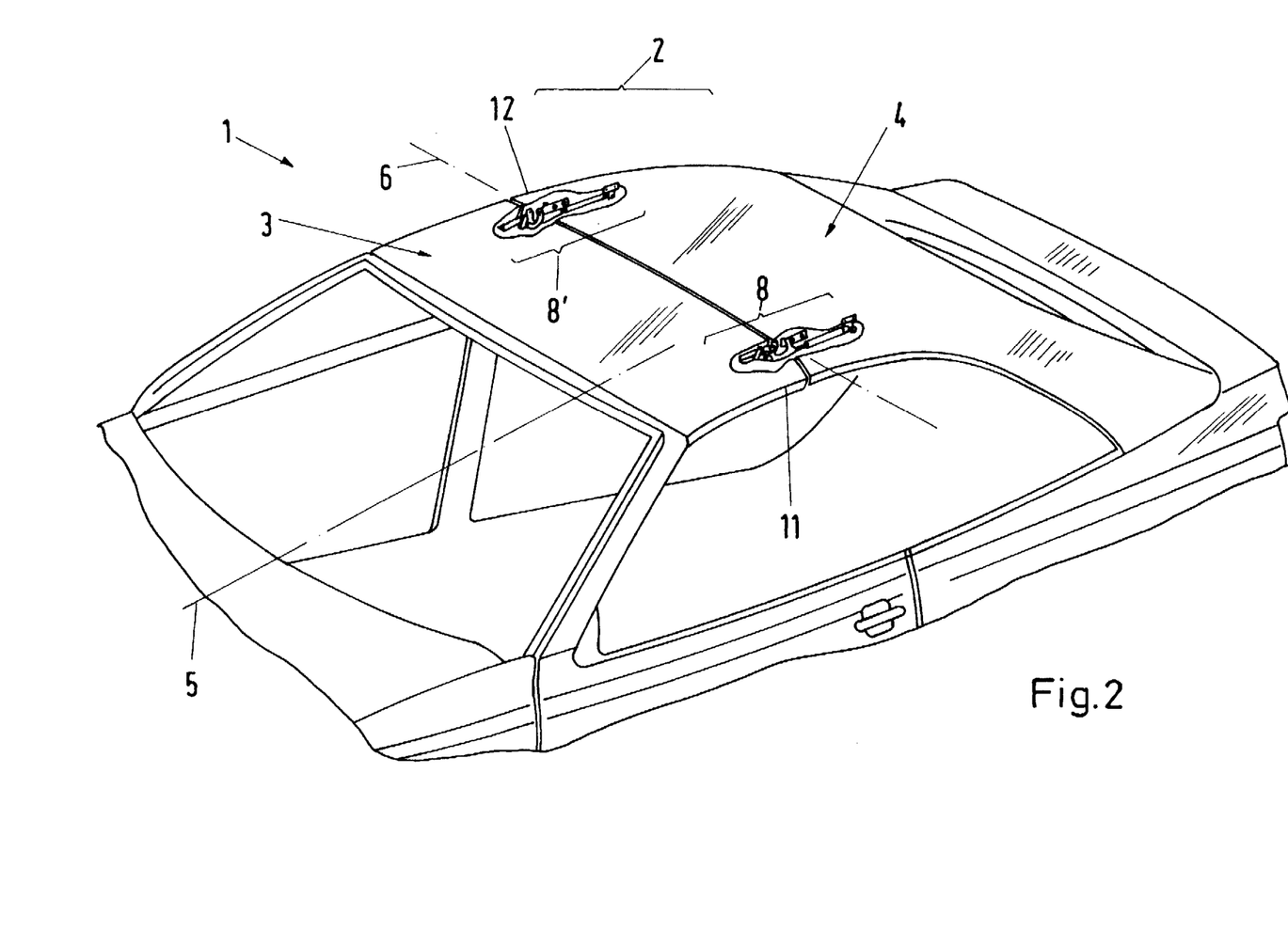
FIG. 2 shows a partially sectional perspective representation of the vehicle with two hinged devices disposed at the edge of stable roof parts (hardtop), particularly one-piece roof parts.
Figure 3:
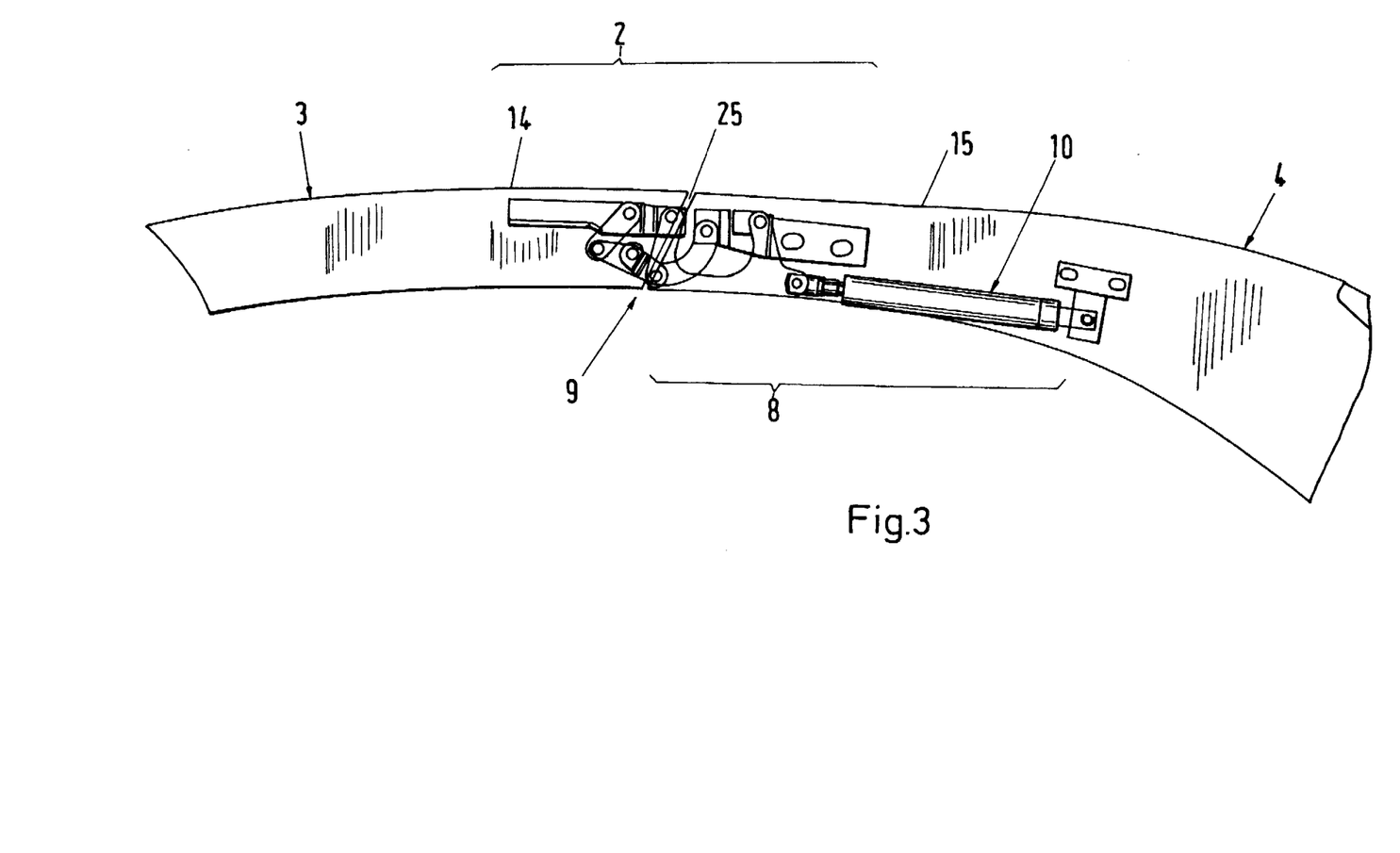
FIG. 3 shows a partially sectional side view of the roof with the two roof parts in the closed position similar to that of FIG. 1, FIGS. 4 to 6 show respective movement phases of the front roof part during the actuation of the hinged device.
Figure 4:
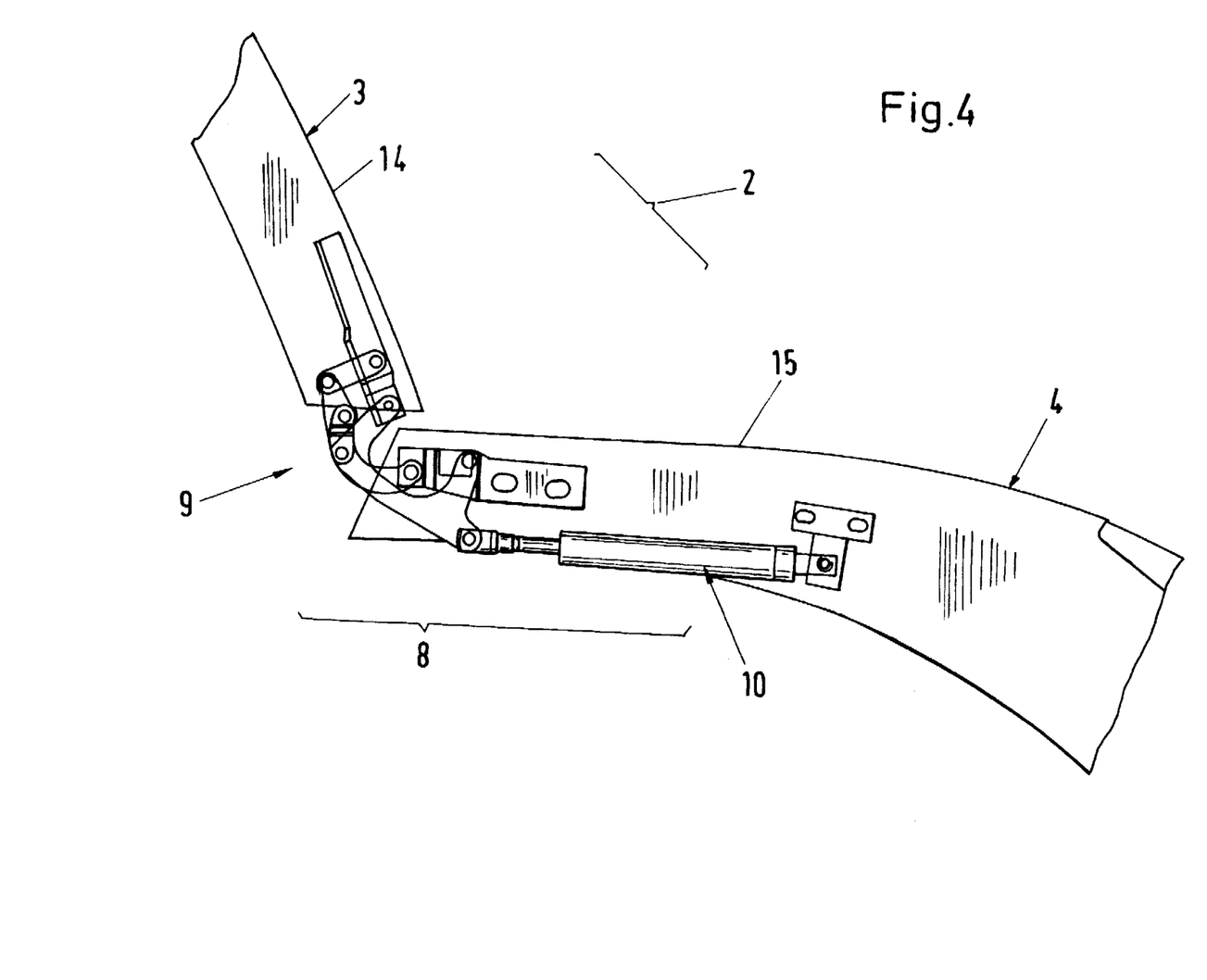
Figure 5:
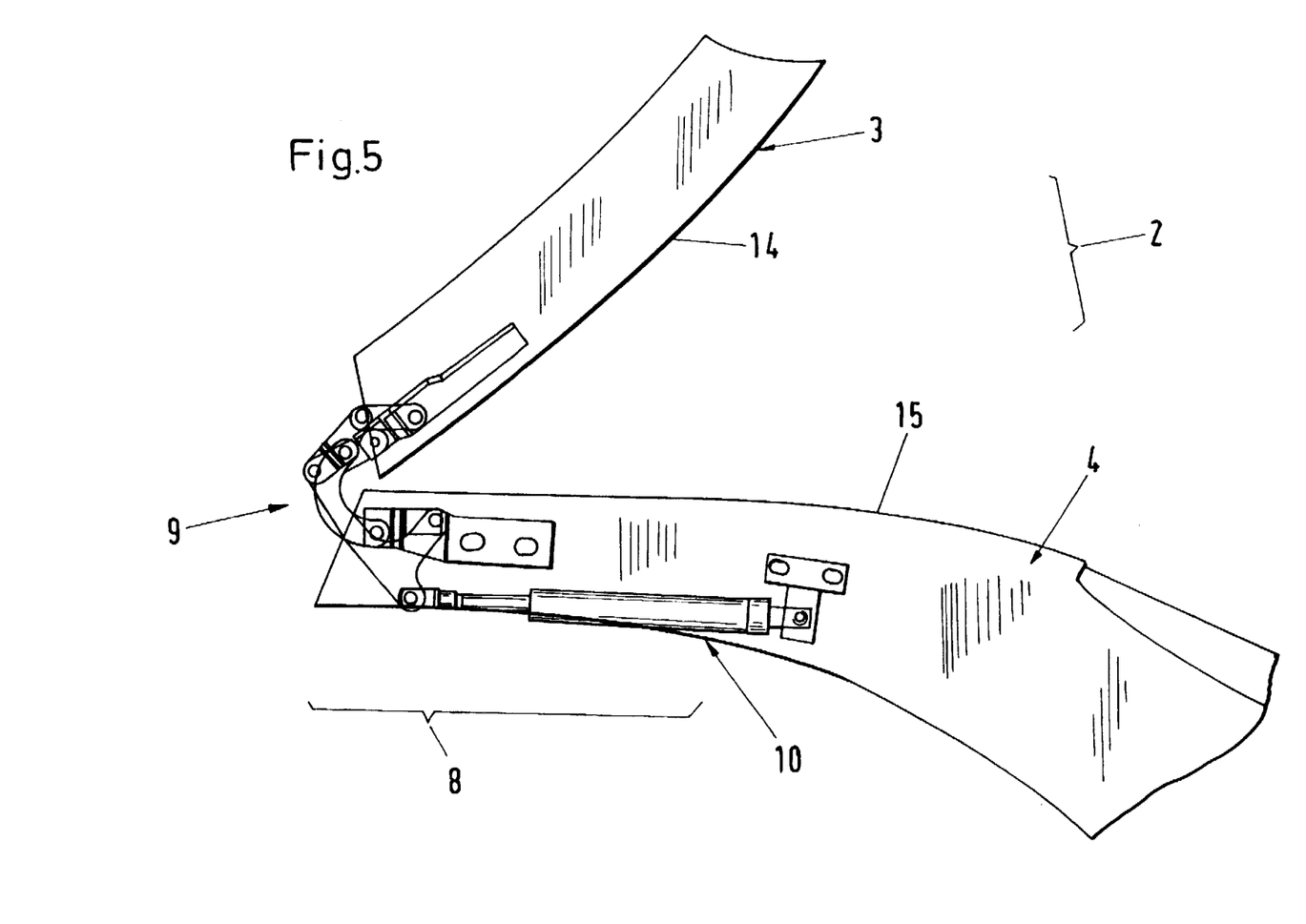
Figure 6:
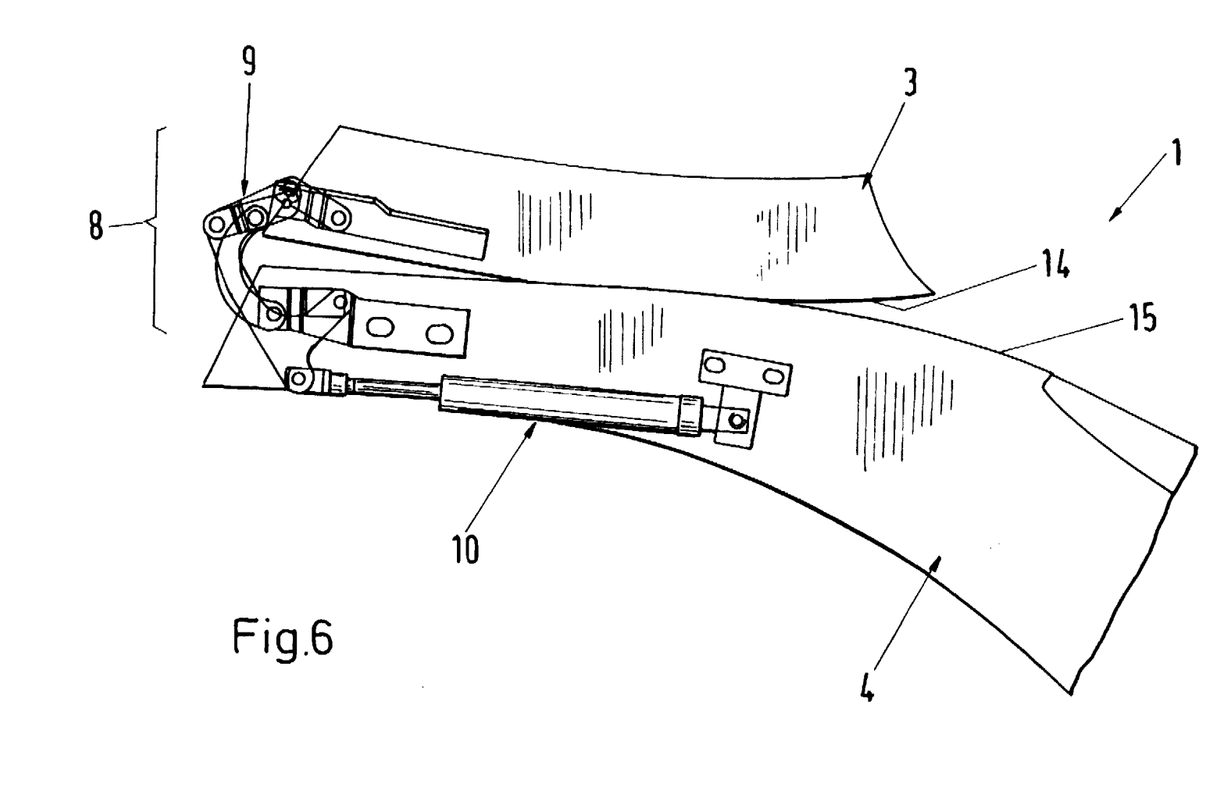

In FIGS. 1 and 2, components of a vehicle are shown, which is labeled 1 as a whole. The roof 2 of the vehicle 1, as movable folding parts connected with the body of the vehicle, has a front roof part 3 and a rear roof part 4. In the region of a transverse axis 6 running perpendicularly to the longitudinal axis 5 of the vehicle 1, these roof parts 3, 4 are provided with a hinged joint, which makes an open and a closed position (FIGS. 3 and 6) of the folding roof 2 possible.

The inventive hinged joint between the roof parts 3 and 4 is constructed as a hinged device, which is labeled 8 as a whole and the pivoting elements 9 of which can be actuated with at least one controllable driving device 10.

The partially sectional perspective representation of FIG. 2 illustrates that the two parts 3 and 4 of the roof are provided with two hinged devices 8, 8' in the region of the transverse axis 6, these hinged devices 8, 8' being disposed as identical components symmetrically to the longitudinal axis 5 of the vehicle 1, close to the side edges 11, 12 of the vehicle 1. It is also conceivable to provide only one driven hinged device between the roof parts 3, 4, which can be disposed, for example, in the region of the longitudinal axis 5 (not shown) of the vehicle I or to provide the hinged devices in an embodiment, which is also not shown, with a common driving device and with transfer elements, which are effective in the direction of the two sides.

In FIGS. 3 to 6, sectional representations of the vehicle 1 show the two roof parts 3, 4 in side views. Starting out from a closed position of FIG. 3, the respective different motion phases during the folding process of the two roof parts 3, 4 under the action of the driven hinged device 8 become clear. In the open position of FIG. 6, the upper side 14 of the front roof part 3 is shifted towards the upper side 15 of the rear roof part 4. The specially designed construction of the pivoting elements 9 at the inventive hinged device 8 defines a controlled curved path (arrow K in FIG. 12) with a pivoting angle S between the two roof parts 3, 4. This pivoting angle S can be greater than 180° (additional angle S'), so that an approach of the roof parts 3, 4 corresponding to their profiling is possible in the region of the upper sides 14, 15 and a space-saving packed position is attained.

Figure 7:
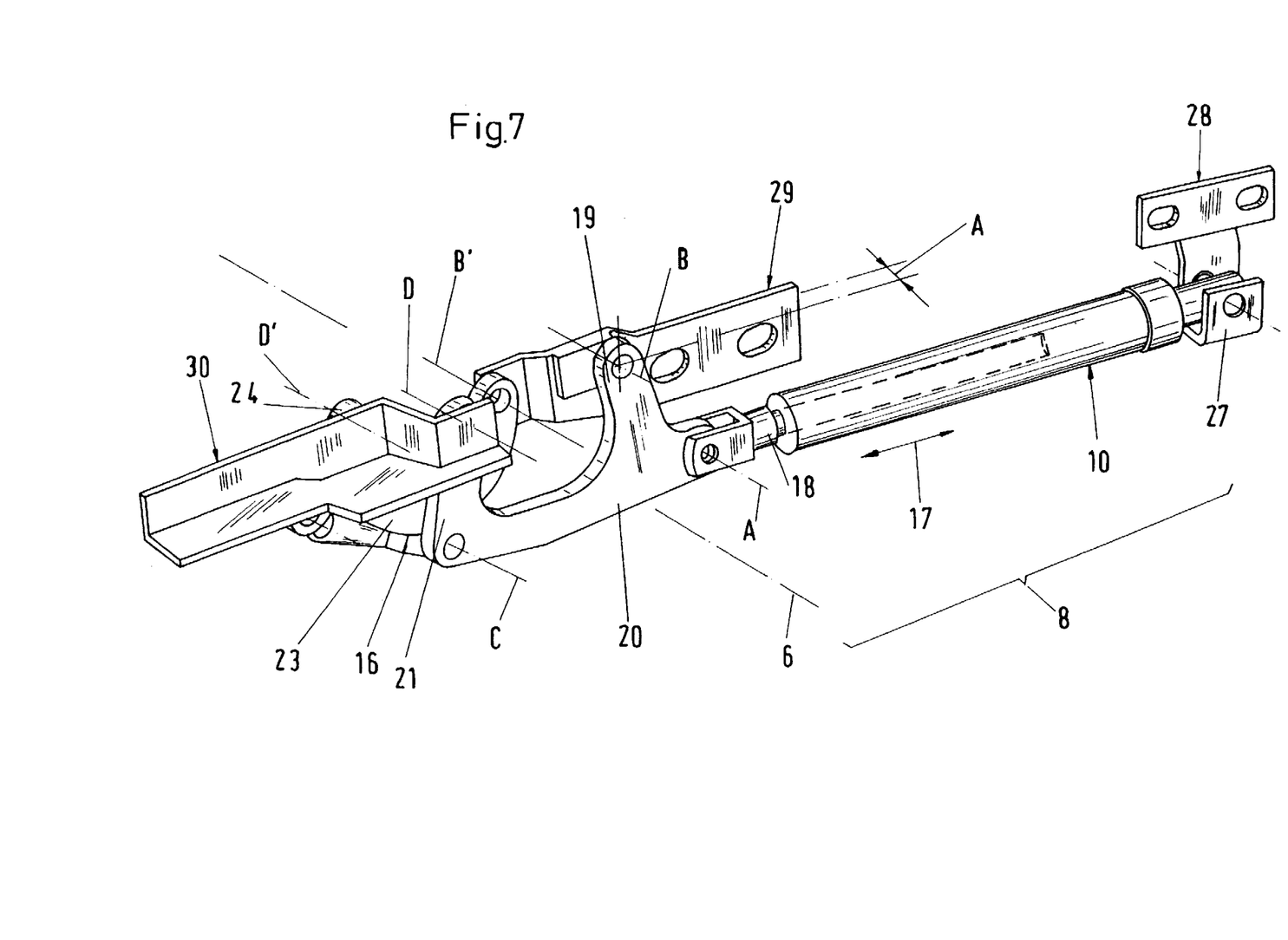
FIG. 7 shows an enlarged detailed representation of the inventive hinged device in perspective view.
Figure 8:
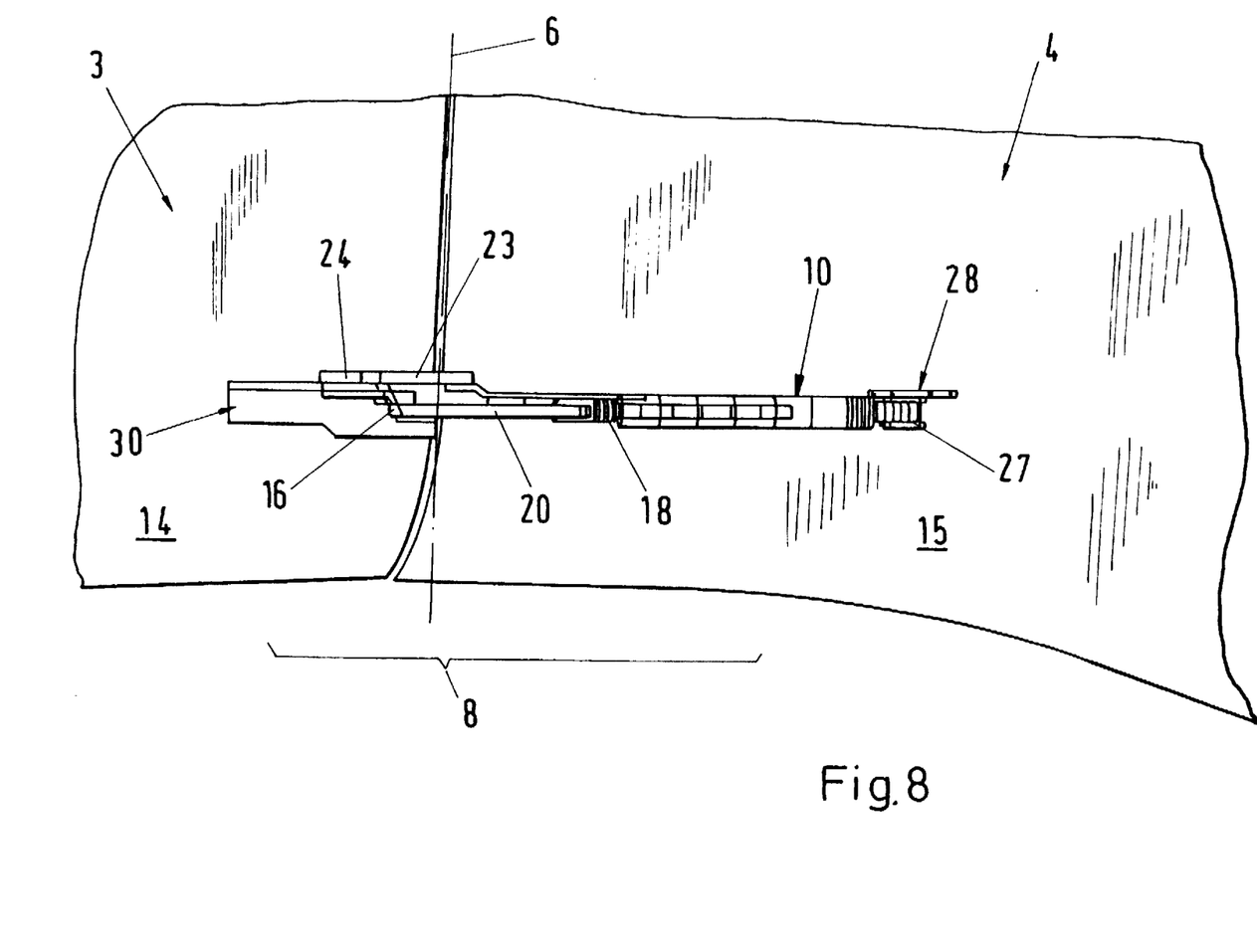
FIG. 8 shows a sectional representation of the two roof parts with the hinged device in plan view.
Figure 9:
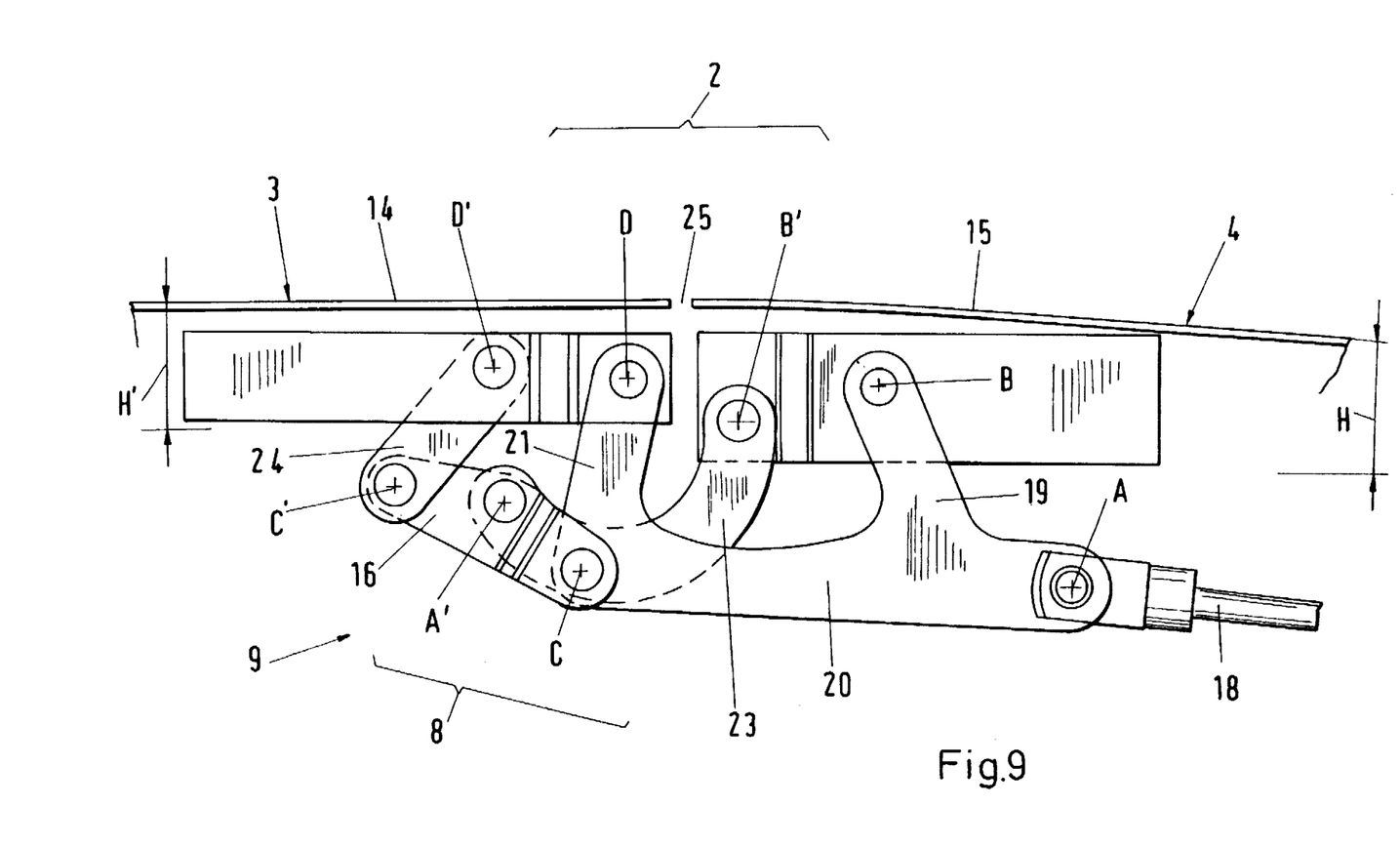
FIGS. 9 to 12 show enlarged sectional representations of the hinged device in different phases of the movement (similar to FIGS. 4 to 6).

The enlarged, detailed representation of FIG. 7 shows the hinged device 8 with the pivoting elements 9 in an exploded representation. Two four-joint devices, in each case having four connecting axes A, B, C, D and A', B' C', D', are provided as pivoting elements. The individual elements of the four-joint devices act together in the hinged-joint chain. In an appropriate embodiment, the two four-joint devices A, B, C, D and A', B' C', D' are connected by a connecting link 16, with which the translatory motion of the driving device 10 (arrow 17) is coupled between the two four-joint devices.

The diagrammatic representations of FIGS. 9 to 12 make it clear that a connecting rod 18 of the driving device 10, constructed in an appropriate embodiment as a working cylinder, engages a connecting axis A of a forked guide 20, the first leg 19 of which is supported at the rear roof part 4 at the connecting axis B. The forked guide 20 has a second leg 21, the end of which is supported directly at the front roof part 3 in the region of the axis D. Moreover, the forked guide 20 is connected in the region of its second leg 21 at a connecting axis C by means of the transfer link 16 with the second four-joint device.

The second four-joint device A', B', C', D' has a part 23, which swings in an arc, engages the middle region of the axis A' and is supported at the rear roof part 4 at the axis B'. In the region of the axis C', a rocker arm 24, which is connected with the front part 3 of the roof at the region of the axis D', is provided at the transverse link 16.

Figure 10:
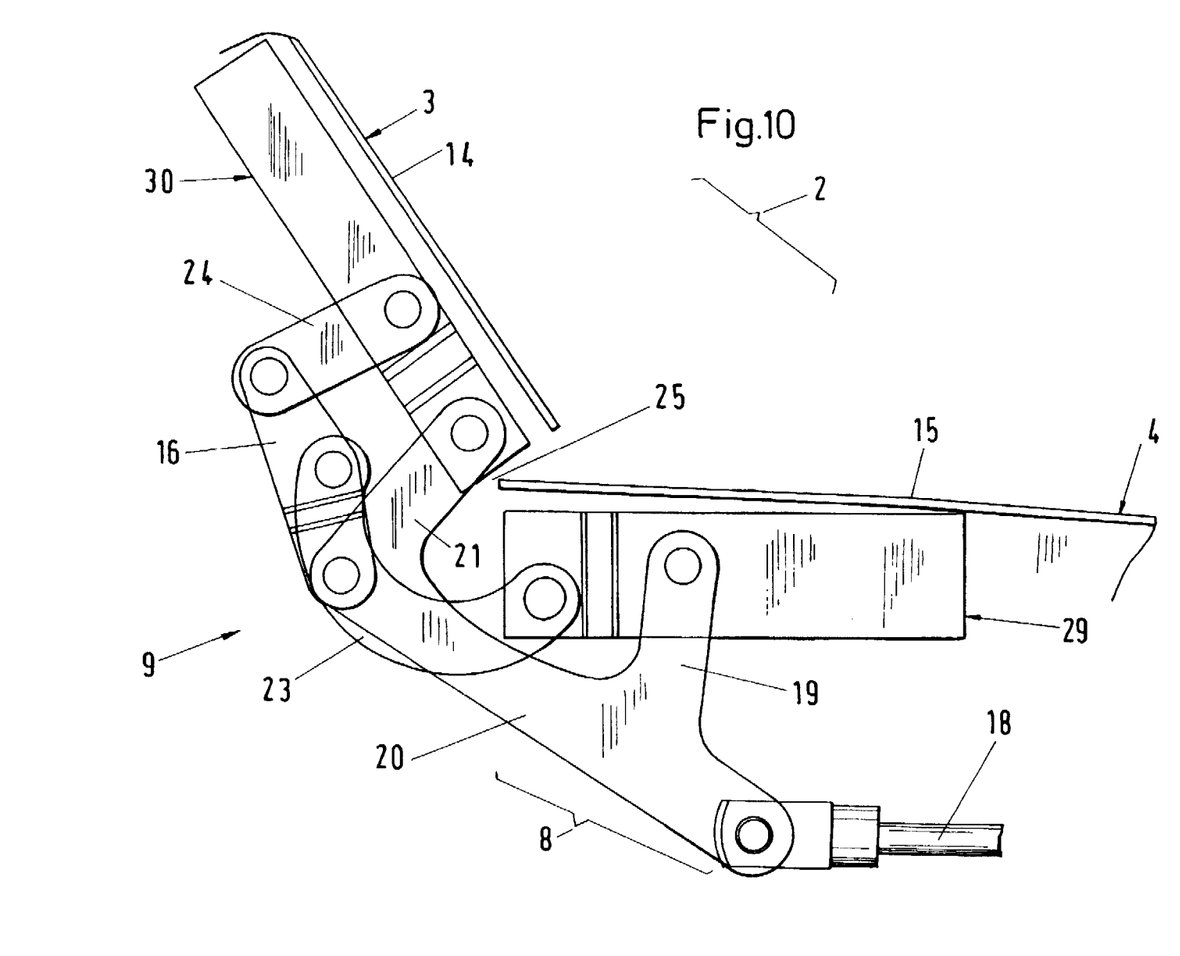
Figure 11:
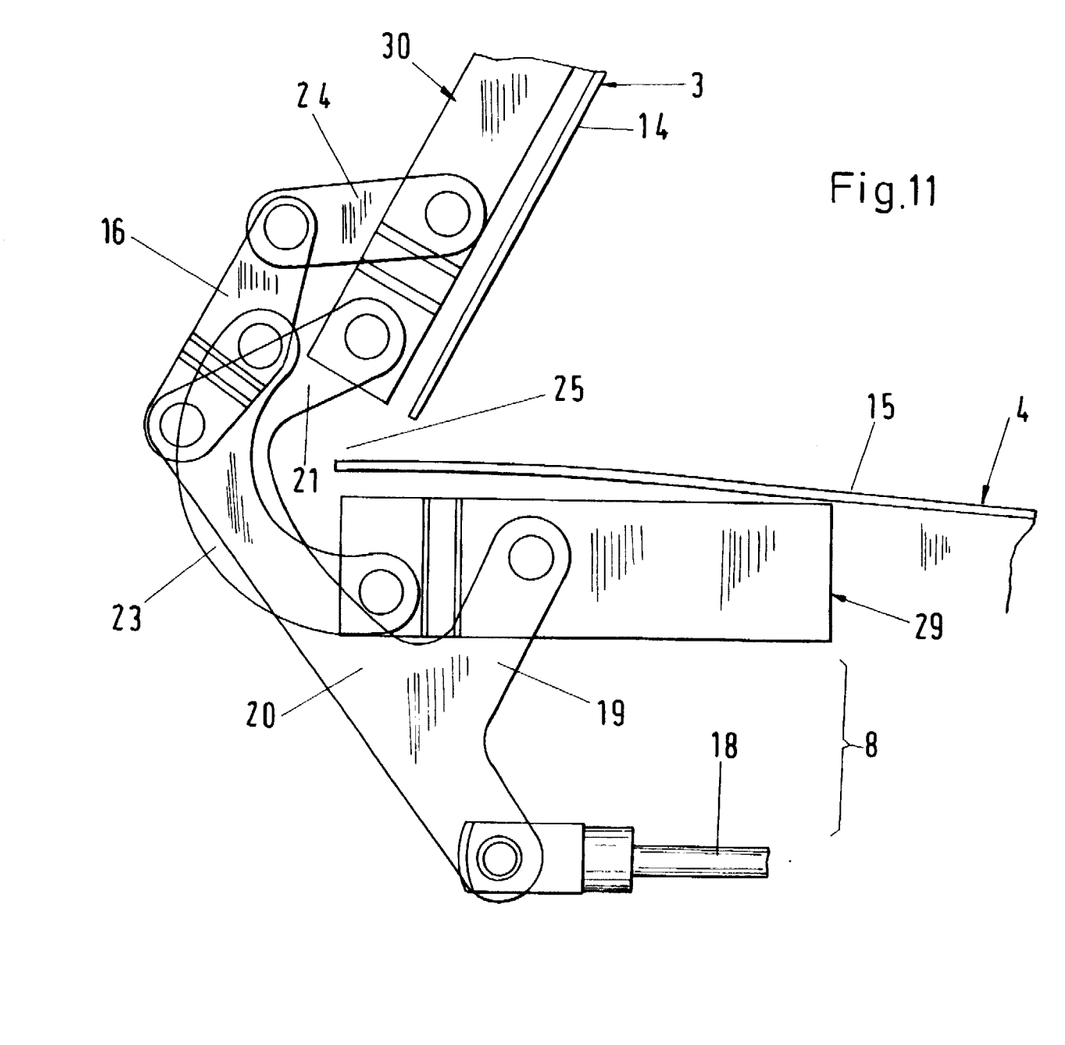
Figure 12:
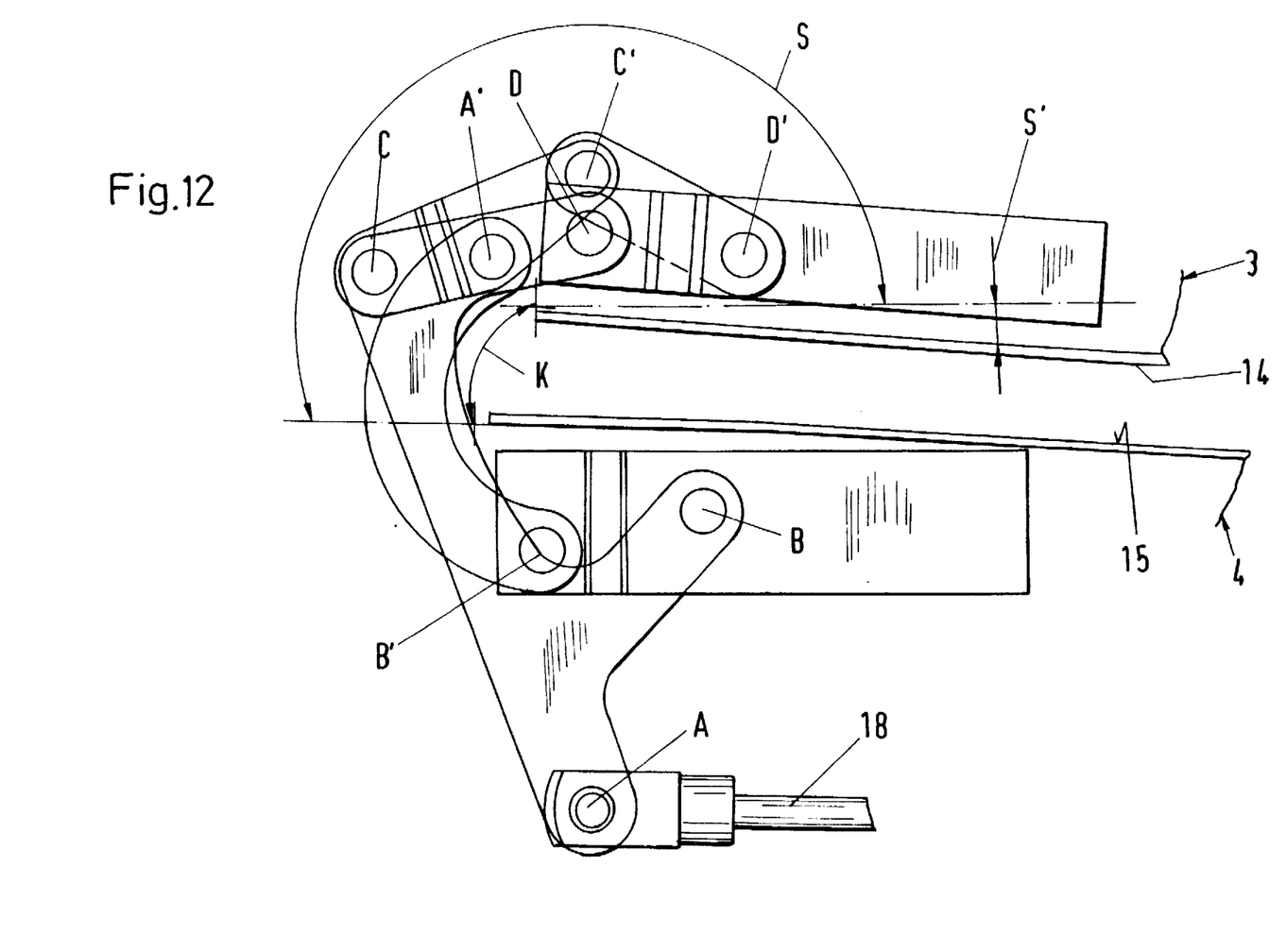

The movement phases, illustrated in FIGS. 10 to 12, make clear the different pivoting positions of the pivoting elements 9 and of the roof parts 3 and 4. In the region of a movement gap 25 existing towards the rear part 4 of the roof, the front part 3 of the roof, under the action of the pivoting device 8, passes in the form of a wide-angle movement through the curved path K (FIG. 12) in such a manner, that contact between the roof parts is precluded and, overall, an adaptation to different component heights H, H' of the roof part construction is possible by means of a different structural dimension of the pivoting elements 9.

The driving device 10, constructed as a working cylinder, is fixed at the cylinder side to the roof part 4 by way of a holding plate 28 having a profiled joint part 27 (FIG. 7). In the region of the pivoting elements 20 and 23, the connecting axes B, B' are formed by a supporting cross member 29 extending along the underside of the roof part. In the region of the front part 3 of the roof, the connecting axes D, D' are provided at an angle plate 30. At the same time, the connecting joints B, B' and D, D' are disposed offset to one another by a distance A (FIG. 7) in the direction of the transverse axis 6, so that the hinged device 8 as a whole can be mounted in an advantageously narrow space.

What I claim is:

1. An operable connection between two roof parts of a vehicle comprising first means between said two roof parts providing for movement of one of said two roof parts relative to the other of said two roof parts between a closed position and an open position, and second means connected to said first means for inverting said one roof part while effecting movement of said one roof part between said open and closed positions.

2. An operable connection according to claim 1 wherein said one and said other roof parts each have an upper side, said one roof part being inverted relative to said other roof part upon being moved from said closed to said open position such that the upper side of said one roof part when in said open position faces said upper side of said other part in a superimposed relationship.

3. An operable connection according to claim 1 wherein said first means provides a pivoting angle of said one roof part relative to said other roof part of at least 180 degrees.

4. An operable connection between two roof parts of a vehicle comprising a hinge mechanism between said two roof parts providing for movement of one of said two roof parts relative to the other of said two roof parts between a closed position and an open position, said two roof parts in said closed position forming a continuing roof in which said one roof part is juxtaposed to said other roof part in a substantially aligned relationship, said two roof parts in said open position being in a superimposed relationship with said one roof part overlying said other roof part, and a drive device connected to said hinge mechanism for inverting said one roof part while effecting movement of said one roof part between said open and closed positions.

5. An operable connection according to claim 4 wherein said one roof part is a front roof part and said other roof part is a rear roof part, said front roof part having a rear edge which transcribes an arcuate path when said front roof part moves between said closed and open positions.

6. An operable connection according to claim 5 wherein said rear roof part has a front edge, said rear edge and said front edge being at substantially the same level when said moveable roof part is in said closed position, said rear edge overlying said rear roof part and being disposed rearwardly of said front edge of said rear roof part when said one roof part is in said inverted open position.

7. An operable connection between two parts comprising a hinge means between said two parts providing for movement of one of said two parts relative to the other of said two parts between a closed position and an open position, and a drive means connected to said hinge means for effecting movement of said one part between said open and closed positions, said hinge means comprising a plurality of pivoting elements disposed between said one and said other parts and having eight mutually offset pivoting axes, said plurality of pivoting elements including two portions with each portion having four of said eight mutually offset pivoting axes, and one of said portions having a connecting link pivotally connecting said two portions.

8. An operable connection between two parts comprising a hinge means between said two parts providing for movement of one of said two parts relative to the other of said two parts between a closed position and an open position, and a drive means connected to said hinge means for effecting movement of said one part between said open and closed positions, said hinge means including a forked guide pivotably connected to said driving means at a first pivot, said forked guide having two legs, one of said legs being pivotably connected to said other part at a second pivot, the other of said legs being pivotably connected to said one part at a third pivot, and linkage means pivotably connected between said forked guide and said one part, said linkage means comprising a rocking arm, a transfer link and a swing part, said rocking arm being pivotably connected to said one part at a fourth pivot, said rocking arm being pivotably connected to said transfer link at a fifth pivot, said transfer link being pivotably connected to said forked guide at a sixth pivot, said swing part being pivotably connected to said transfer link at a seventh pivot, and said swing part being pivotably connected to said other part at an eighth pivot.

9. An operable connection according to claim 8 wherein said first to eighth pivots are all spaced from one another.

10. An operable connection according to claim 8 wherein said first to eighth pivots have pivot axes which are all parallel to one another.

11. An operable connection according to claim 8 wherein said one part is a front roof part of a vehicle having a rear edge, said other roof part is a rear roof part of a vehicle having a rear edge, said eighth pivot being closer to said front edge than said second pivot, said third pivot being closer to said rear edge than said fourth pivot.

12. An operable connection according to claim 8 wherein said seventh pivot is disposed intermediate of said fifth and sixth pivots.

13. An operable connection according to claim 8 wherein said swing part has an arcuate configuration.

14. An operable connection according to claim 8 wherein said forked guide part has a base section from which said first and second legs extend, said first and sixth pivots being disposed on said base section.

15. An operable connection according to claim 8 wherein said second and eighth pivots having parallel axes, said second pivot being offset from said eighth pivot in the axial direction of said parallel axes.

16. An operable vehicle according to claim 8 wherein said third and fourth pivots have parallel axes, said third pivot being offset from said fourth pivot in the axial direction of said parallel axes.

17. An operable connection according to claim 8 wherein said fifth and sixth pivots have parallel axes, said fifth pivot being offset from said seventh pivot in the axial direction of said parallel axes.

18. An operable connection between two parts according to claim 1 wherein said hinge mechanism is operable to effect movement of said one roof part along an arcuate path of travel as said one roof part moves between said open and closed positions.

19. An operable connection between two parts according to claim 4 wherein said one roof and said other roof parts each have an upper side which face upwardly when said roof parts are in said closed position, said upper side of said one roof part facing downwardly when said one roof part is in said open position.

20. An operable connection between two roof parts of a vehicle comprising a hinge mechanism between said two roof parts providing for movement of one of said two roof parts between a closed position and an open position, said one roof part traversing an arcuate path when moving between said open and closed positions, and a drive device connected to said hinge mechanism for inverting said one roof part while effecting movement of said one roof part between said open and closed positions, said one roof part overlying said other roof part when said one roof part is in said open position.

* * * * *